Jan. 11, 1949.　　　　C. WILLIAMS　　　　2,458,666
TRAILER DOLLY
Filed Nov. 30, 1945　　　　　　　　2 Sheets-Sheet 2
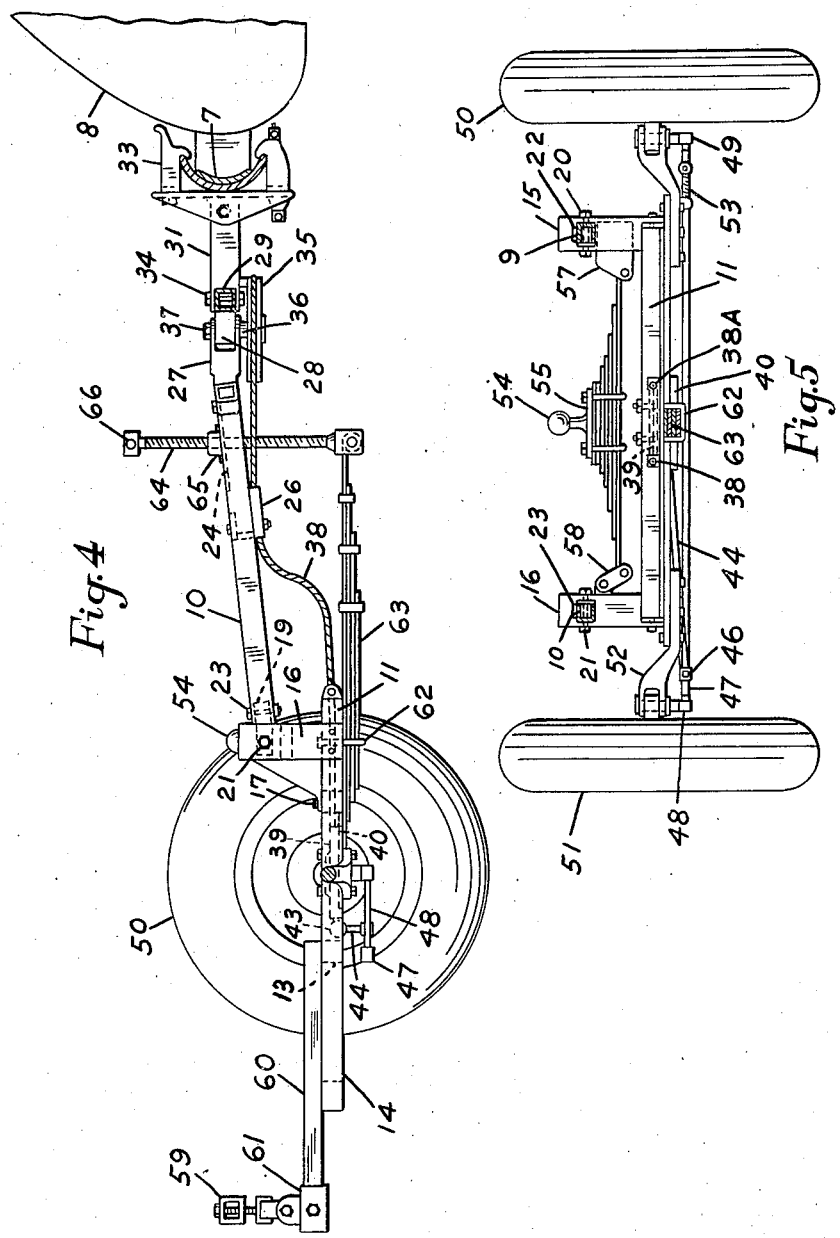
INVENTOR
CHESTER WILLIAMS
BY Edward M. Apple
ATTORNEY Patented Jan. 11, 1949

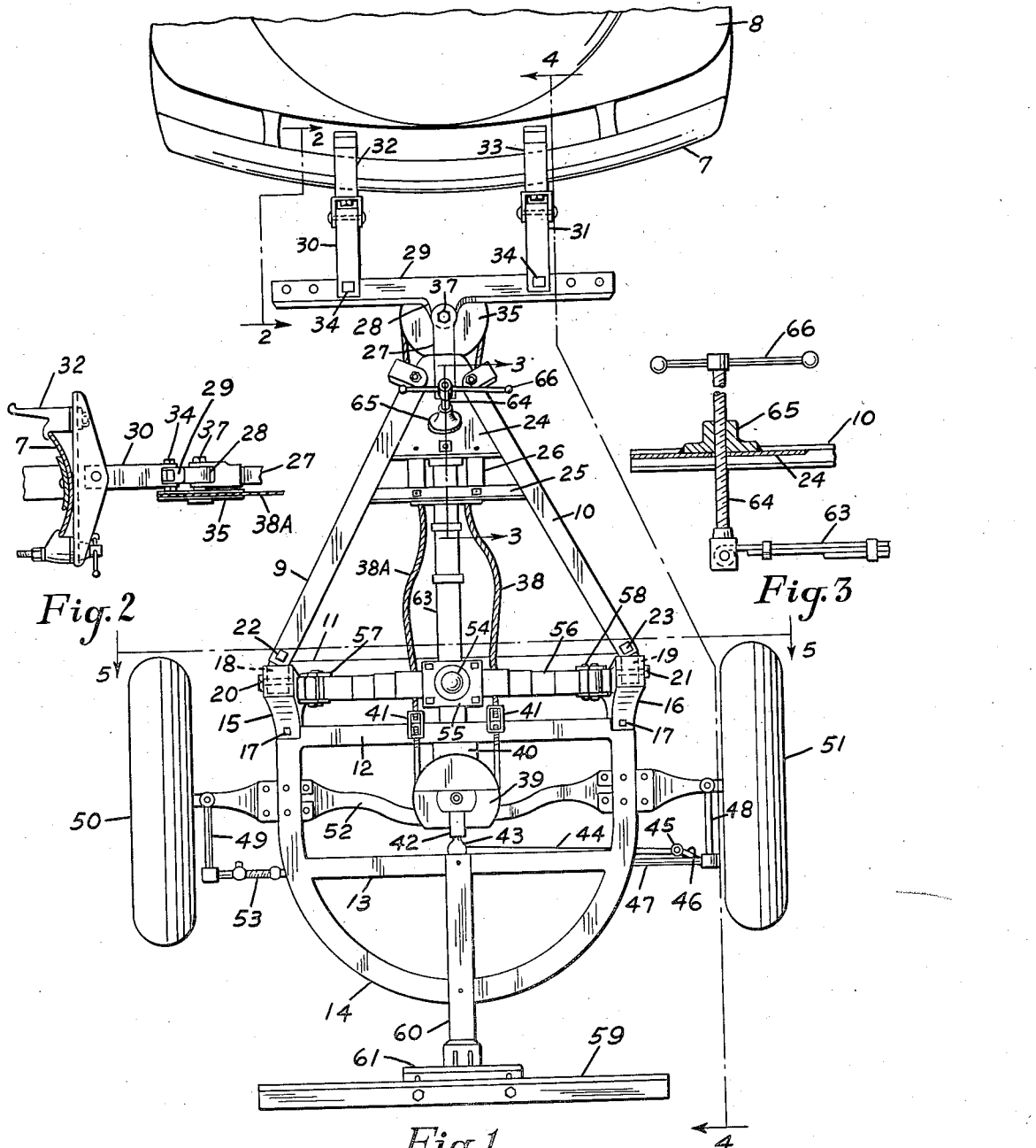

2,458,666

UNITED STATES PATENT OFFICE 2,458,666

TRAILER DOLLY

Chester Williams, Ypsilanti, Mich.

Application November 30, 1945, Serial No. 631,899

7 Claims. (Cl. 280—33.55)

This invention relates to automobile trailers, and particularly to a dolly for supporting the front end of a trailer.

An object of the invention is the provision of a device of the character indicated, which is adapted to take the weight of the trailer off of the back end of the towing automobile.

Another object of the invention is the provision of a device of the character indicated, which obviates the necessity of providing the towing automobile with overload springs.

Another object of the invention is the provision of a device of the character indicated, which provides positive steering for the trailer as the towing automobile is turned.

Another object of the invention is the provision of a device of the character indicated, which is constructed and arranged with a weight equalizing mechanism, whereby weight can be placed on the rear of the towing automobile if desirable for traction purposes.

A further object of the invention is the provision of a device of the character indicated, which is constructed and arranged so that the trailer may be backed and parked with greater ease.

Another object of the invention is the provision of a device of the character indicated, which is constructed and arranged so that it may be attached to the rear bumper of any automobile.

The foregoing and other objects and advantages of the invention will become more apparent as the description proceeds, reference being made to the accompanying drawings forming part of the within disclosure, in which drawings:

Fig. 1 is a plan view of a device embodying my invention, secured to the rear bumper of a towing automobile.

Fig. 2 is a section taken substantially on the line 2—2 of Fig. 1.

Fig. 3 is a section taken substantially on the line 3—3 of Fig. 1.

Fig. 4 is a section taken substantially on the line 4—4 of Fig. 1.

Fig. 5 is a section taken substantially on the line 5—5 of Fig. 1.

Referring now more particularly to the drawings, it will be understood that in the embodiment herein disclosed (Figs. 1 and 4), I illustrate my improved device secured to the rear bumper 7 of a passenger automobile 8. In these views, the house trailer with which it is to be used is not illustrated. The application to the trailer, however, will be described hereinafter.

My improved dolly consists of a front frame assembly comprising the members 9 and 10, and a rear frame assembly comprising the members 11, 12, 13, and 14. The front frame assembly 9 and 10, is connected to the rear frame assembly 11, 12, 13, and 14 through upright members 15 and 16, the latter being secured to the rear frame assembly by means of bolts 17 or other suitable means. The members 9 and 10 are secured to the upright members 15 and 16 through intermediate members 18 and 19 by means of bolts 20, 21, 22, and 23, so that there may be vertical movement between the parts.

The front frame members 9 and 10 are tied together by means of a plate 24 and a cross arm 25, which is adapted to support the cable guides 26. Secured to the front end of the plate 24 by welding or other suitable means, is a clevis 27, which is adapted to engage an ear 28 formed on the end of a cross bar 29, to which is secured the arms 30 and 31, to which are secured the bumper clamps 32 and 33, the latter being adjustable to accommodate any size bumper.

The arms 30 and 31 are adjustable on the bar 29 as at 34 to accommodate different style bumpers. Keyed to the ear 28 and adapted to rotate therewith is a pulley 35. The pulley 35 is supported on a shaft 36, which extends through the ear 28 and the ends of the clevis 27, and is secured in position by means of a nut 37. Cables 38 and 38A are secured to the pulley 35 and extend through cable guides 26 to a second pulley 39, which is supported for rotation on a suitable bearing member 40, which in turn is supported by the member 12 of the front frame assembly.

The slack in the cables 38 and 38A may be taken up by means of members 41. The pulley 39 has secured thereto a rearwardly extending arm 42, at the end of which is a socket 43, adapted to engage a ball secured at the end of the steering rod 44, which in turn is pivotally connected, as at 45, to the arm 46, which is connected to the tie rod 47, which is adapted to rotate the spindle arms 48 and 49 to turn the wheels 50 and 51, which are adapted to rotate at either end of the supporting axle 52. The tie rod 47 has adjusting means 53.

The trailer, which the device is intended to support and steer, is mounted on the dolly so that its front end is supported on the ball member 54, the latter being supported on a suitable member 55, mounted at the center of the transverse spring 56, which in turn is secured by spring shackles 57 and 58 to the upright members 15 and 16. The shackle 57 (Fig. 5) is fixed at one end to the upright 15 to prevent side sway.

An intermediate portion of the trailer frame is adapted to rest on a cross bar 59, which is adjustably secured at the end of the bar 60, which is secured, by welding or other suitable means, to the rear frame assembly 12, 13, and 14. The bar 59 is adjustable for width by means of a slotted clamp 61.

Secured to the under side of the member 11 by means of U bolts 62 (Figs. 4 and 5), is a leaf spring 63, the free end of which is secured to a threaded rod 64, which extends through a collar member 65, which is mounted on the plate 24. The screw rod 64 is adapted to be rotated by means of the handle 66 and serves to put pressure on the spring 63, so that an adjustment of weight may be effected on the rear of the towing automobile.

The device is hooked up and used as follows:

The front end of the trailer is first jacked up and blocked. The trailer dolly is then moved under the front end of the trailer and the trailer is lowered so that the weight of the trailer rests on the ball 54. The blocks are then removed from under the trailer, and the axle of the dolly is perfectly aligned with the axle of the trailer, after which the cross arm 59 is secured to the trailer frame. Tow-in or tow-out adjustment is made on the tie rod 47 through the adjustment 53. The dolly is then attached to the car by means of the clamps 32 and 33. The cables 38 and 38A are then given slack, and with the cables' slack, the car is driven forward so that the dolly wheels will automatically align themselves. The cables are then made fast and the device is ready to use.

As the towing car 8 turns from one direction to another, the cross bar 29 turns with it, causing the pulley 35 to turn in the same direction. This in turn causes either the cable 38 or 38A to rotate the pulley 39 in the same direction, thereby turning the wheels 50 and 51 of the dolly to steer the trailer in the corresponding direction.

Although the device is intended to entirely eliminate the weight of the trailer from the rear end of the towing automobile, provision is made to add weight to the rear end of the car by adjustment of the screw 64, should occasion demand that the towing car have more weight for traction purposes.

Having described my invention, what I claim and desire to secure by Letters Patent is:

1. In a device of the character described, the combination of an axle, steerable wheels on said axle, a frame secured to said axle, said frame having forward and rearward sections pivoted together, means for connecting the forward section of the frame to an automobile bumper, means on said forward section for steering said wheels, means on said rearward section for supporting the front end of a trailer and a leaf spring secured at one end to said rearward section and secured at the other end to an adjustable member carried by said forward section.

2. The combination defined in claim 1, in which the means on said rearward section for supporting the front end of a trailer includes a leaf spring transversely mounted between uprights on said rearward section.

3. The combination defined in claim 1, in which the means on said rearward section for supporting the front end of a trailer includes a transversely mounted leaf spring having a ball support thereon, and a rearwardly extending arm having an adjustable cross arm.

4. The combination defined in claim 1, including a threaded collar mounted on the forward section of the frame, and a threaded rod rotatably mounted in said collar and secured at one end to one end of the said leaf spring.

5. The combination defined in claim 1 in which said forward section is pivotally mounted to said rearward section, and said resilient means comprises a leaf spring mounted at one end to said rearward section, and secured at the other end to a rod adjustably mounted in a collar carried by the said forward section.

6. In a device of the character described, the combination of an axle, steerable wheels on said axle, means in cooperation with the bumper of a towing automobile for steering said wheels, a frame section secured to said axle, said frame section having a rearwardly extending arm and cross arm, uprights on said frame section, a leaf spring having a ball support mounted between said uprights, a second frame section pivoted to said uprights, a second leaf spring secured to said first-named frame section and extending forwardly beneath said second frame section, and adjustable means between said last-named leaf spring and said second frame section.

7. The combination defined in claim 6, in which said second frame section has means for pivotally securing it to the bumper of an automobile.

CHESTER WILLIAMS.

REFERENCES CITED

The following references are of record in the file of this patent:

UNITED STATES PATENTS

| Number | Name | Date |
|---|---|---|
| 2,306,007 | Thorp | Dec. 22, 1942 |
| 2,309,766 | Harroun et al. | Feb. 2, 1943 |
| 2,338,934 | Gross | Jan. 11, 1944 |
| 2,379,265 | Whitmer | June 26, 1945 |
| 2,410,241 | Schramm | Oct. 29, 1946 |
| 2,430,906 | Burt | Nov. 18, 1947 |